(12) United States Patent
Makowska et al.

(10) Patent No.: US 11,631,913 B2
(45) Date of Patent: Apr. 18, 2023

(54) ASSEMBLY OF BATTERY CELLS, AND AIRCRAFT COMPRISING SUCH AN ASSEMBLY

(71) Applicant: Rolls-Royce Deutschland Ltd & Co KG, Blankenfelde-Mahlow (DE)

(72) Inventors: Agnieszka Makowska, Fürth (DE); Andreas Meyer, Nuremberg (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 297 days.

(21) Appl. No.: 16/753,668

(22) PCT Filed: Sep. 27, 2018

(86) PCT No.: PCT/EP2018/076256
§ 371 (c)(1),
(2) Date: Apr. 3, 2020

(87) PCT Pub. No.: WO2019/068549
PCT Pub. Date: Apr. 11, 2019

(65) Prior Publication Data
US 2020/0251795 A1 Aug. 6, 2020

(30) Foreign Application Priority Data
Oct. 4, 2017 (DE) .......................... 102017217583.4

(51) Int. Cl.
*H01M 10/6567* (2014.01)
*H01M 10/6551* (2014.01)
(Continued)

(52) U.S. Cl.
CPC ... *H01M 10/6567* (2015.04); *H01M 10/0525* (2013.01); *H01M 10/613* (2015.04);
(Continued)

(58) Field of Classification Search
CPC ... B64D 27/24; B64D 33/08; H01M 10/0525; H01M 10/613; H01M 10/625;
(Continued)

(56) References Cited

U.S. PATENT DOCUMENTS

2010/0003581 A1* 1/2010 Kawai ............... H01M 10/6551
361/521
2012/0003510 A1* 1/2012 Eisenhour ........... H01M 10/625
429/50
(Continued)

FOREIGN PATENT DOCUMENTS

CN 102668327 A 9/2012
CN 205992807 U 3/2017
(Continued)

OTHER PUBLICATIONS

German Search Report for German Application No. 10 2017 217 583.4 dated Aug. 6, 2018.
(Continued)

*Primary Examiner* — Lingwen R Zeng
(74) *Attorney, Agent, or Firm* — Lempia Summerfield Katz LLC

(57) ABSTRACT

An assembly includes a plurality of electrically interconnected battery cells in a housing. An electrically insulating coolant fluid that directly surrounds the plurality of electrically interconnected battery cells flows around the plurality of electrically interconnected battery cells in the housing. An aircraft having an assembly of this type is also provided.

17 Claims, 1 Drawing Sheet

(51) Int. Cl.
*H01M 10/613* (2014.01)
*H01M 10/0525* (2010.01)
*H01M 10/625* (2014.01)
*B64D 33/08* (2006.01)
*B64D 27/24* (2006.01)

(52) U.S. Cl.
CPC ..... *H01M 10/625* (2015.04); *H01M 10/6551* (2015.04); *B64D 27/24* (2013.01); *B64D 33/08* (2013.01); *H01M 2220/20* (2013.01); *Y02E 60/10* (2013.01); *Y02T 50/60* (2013.01)

(58) Field of Classification Search
CPC ......... H01M 10/6551; H01M 10/6567; H01M 2220/20; Y02E 60/10; Y02T 50/60
See application file for complete search history.

(56) References Cited

U.S. PATENT DOCUMENTS

| | | |
|---|---|---|
| 2017/0279172 A1 | 9/2017 | Tucker |
| 2018/0108959 A1* | 4/2018 | Kuboki ............... H01M 10/625 |

FOREIGN PATENT DOCUMENTS

| | | |
|---|---|---|
| DE | 112008001424 T5 | 4/2010 |
| DE | 102008043306 A1 | 5/2010 |
| DE | 102008044169 A1 | 6/2010 |
| DE | 102010013033 A1 | 9/2011 |
| DE | 102013218489 A1 | 3/2015 |
| DE | 102013017396 A1 | 4/2015 |
| DE | 102014203644 A1 | 9/2015 |
| EP | 2068383 A1 | 6/2009 |
| EP | 2132823 B1 | 3/2011 |
| WO | WO2008093182 A1 | 8/2008 |
| WO | WO2011105256 A1 | 9/2011 |

OTHER PUBLICATIONS

International Search Report and the Written Opinion for International Patent Application PCT/EP2018/076256 dated Dec. 13, 2018.
Chinese Office Action for Chinese Application No. 201880085286.4 dated Dec. 30, 2021, with English translation.

* cited by examiner

ASSEMBLY OF BATTERY CELLS, AND AIRCRAFT COMPRISING SUCH AN ASSEMBLY

This application is the National Stage of International Application No. PCT/EP2018/076256, filed Sep. 27, 2018, which claims the benefit of German Patent Application No. 10 2017 217 583.4, filed Oct. 4, 2017. The entire contents of these documents are hereby incorporated herein by reference.

FIELD

The present embodiments relate to an assembly having a plurality of electrically interconnected battery cells in a housing, and to an aircraft having an assembly of this type.

BACKGROUND

It is known that, in both stationary applications (e.g., in wind power installations) and in mobile applications (e.g., in electric vehicles such as electrically-powered aircraft), lithium-ion accumulators, lithium-polymer accumulators, or nickel-metal hybride accumulators are employed as rechargeable electrical energy stores.

Lithium-ion accumulators include a positive electrode (e.g., a cathode) and a negative electrode (e.g., an anode) that may reversibly capture lithium ions (Li+) during charging (e.g., intercalation), and release the lithium ions again during discharging (e.g., deintercalation). Lithium-ion accumulators have a high energy density and a low spontaneous discharge.

Battery systems of this type are required to fulfil highly stringent requirements with respect to useful energy content, efficiency of charging/discharging, reliability, service life, and any unwanted loss of capacity associated with frequent partial discharges.

A battery system includes a plurality of battery cells. On the grounds of an internal cell resistance and the occurrence of electrochemical processes, battery cells undergo heat-up during charging and discharging. Battery cells may be interconnected in series in order to increase the electrical voltage and/or interconnected in parallel in order to increase the battery capacity. Battery cells may be combined to constitute battery units or battery modules. In an application for the propulsion of vehicles, for example, several hundred battery cells may be interconnected in series or in parallel. In a high-voltage battery system, the overall voltage may thus, for example, be of the order of 450 V to 600 V.

The permissible temperature range for the operation of battery cells typically lies between −30° C. and +70° C. or between +5° C. and +35° C. In the lower operating temperature range, the performance capability of the battery cells may decline significantly. At temperatures below the order of 0° C., the internal resistance of battery cells rises substantially, and both the performance capability and the efficiency of battery cells decline continuously as the temperature falls further. Battery cells may also sustain irreversible damage as the temperature falls further.

The performance capability of battery cells may be significantly impaired even if the operating temperature is exceeded. At temperatures in excess of approximately 40° C., the service life of battery cells is reduced. Again, the battery cells may sustain irreversible damage. The permissible temperature difference (e.g., temperature gradient) for the operation of the battery cells in a battery cell and/or within a battery module or a battery typically lies between 5 degrees Kelvin and 10 degrees Kelvin. In the event of greater temperature differences, different regions of a battery cell or different battery cells in a battery module or a battery may experience different loading, or may even be overloaded (e.g., partially overloaded) and/or damaged. On the grounds of temperature differences and/or temperature variations, there is a risk of the formation of condensation in the battery. Damage may result in the accelerated ageing of the battery cells or in the thermal runaway of battery cells, which constitutes a hazard to persons and the environment.

Published patent application DE 10 2014 203 644 A1 discloses a heat-exchanger and a method for the temperature control of a battery using lines for the conduction of a temperature control medium through the battery.

In order to provide safety, functional capability, and service life of the battery module or of the battery system, thermal runaway of the individual battery cells is to be prevented under any circumstances.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an assembly, by which any thermal runaway of a battery, further to the runaway of one or more battery cells, is effectively prevented.

Any battery cell may undergo thermal runaway. It is therefore important that the propagation of thermal runaway from one battery cell to another, in the manner of a chain reaction, is prevented.

According to the present embodiments, all the battery cells of a battery module are located in a housing (e.g., a battery housing). The battery cells are directly surrounded by an electrically insulating coolant fluid. Natural convection in the coolant fluid is sufficient for the purposes of heat transfer. Any active circulation of the coolant fluid is not necessary.

In the event of a temperature increase through one or more battery cells, the coolant fluid is set in motion. Heat may be evacuated from the coolant fluid using heat sinks, such as cooling elements with cooling ribs, that are located in the interior of the housing (e.g., on a housing wall). Additionally, further cooling elements may be situated on the exterior of the housing wall for the improved evacuation of heat.

In the event of a pronounced heat-up, a phase transition of the coolant fluid may occur. The resulting gases are evacuated by valves on the housing.

The present embodiments include an assembly having a plurality of electrically interconnected battery cells (e.g., battery cells) in a housing. An electrically insulating coolant fluid that directly surrounds the battery cells is present in the housing.

Any transmission of battery heat-up from one cell to another may be prevented by the coolant fluid (e.g., an insulating oil).

In one embodiment, the insulating oil may be a silicone oil.

In a further development, the assembly may include at least one first cooling element that is arranged on the housing in the interior of the housing and functions as a heat-sink for the take-up of heat from the coolant fluid and the evacuation thereof to the housing and/or to the environment.

The at least one first cooling element may include first cooling ribs and/or be at least partially constituted of metal.

In a further configuration, the assembly may include at least one second cooling element arranged on the exterior of the housing. The at least one second cooling element functions as a heat sink and may execute the take-up of heat from the first cooling element and/or from the housing and the evacuation thereof to the environment.

The second cooling element may include second cooling ribs and/or be at least partially constituted of metal.

In a further development, the arrangement includes at least one valve that is configured on the housing. The at least one valve, upon the transition of the coolant fluid to a gaseous state, may evacuate the gas thus formed.

In a further development, a coolant is situated outside the housing. The coolant at least partially surrounds the housing. The coolant may be air or a fluid such as, for example, water.

The coolant may be cooled by a cooling unit.

The battery cell may be a lithium-ion battery cell, a lithium-polymer battery cell, or a solid electrolyte battery.

The present embodiments further include an aircraft including an electrical drive and an assembly according to the present embodiments.

DETAILED DESCRIPTION

Figure 1:
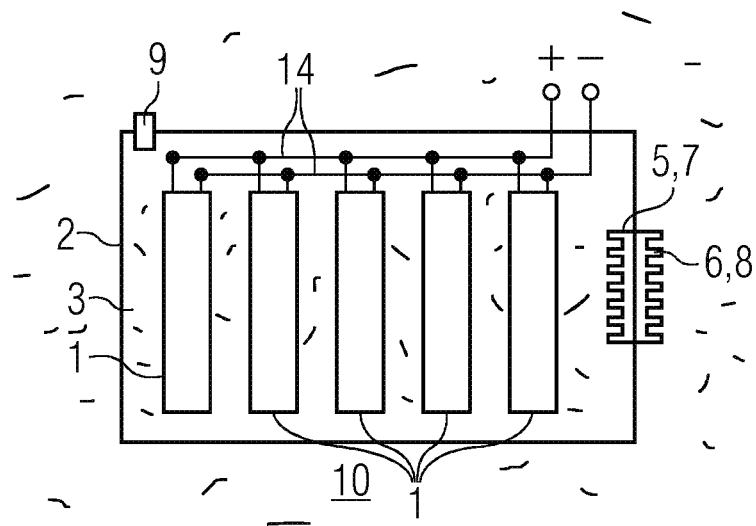
FIG. 1 shows one embodiment of an assembly for cooling battery cells.

FIG. 1 shows one embodiment of an assembly for cooling battery cells 1 that protects the battery cells 1 against thermal runaway. The battery cells 1 are arranged in a housing 2 (e.g., a battery housing; a fluid-tight housing) and are electrically interconnected by electrical lines 4. All the battery cells 1 are surrounded by a coolant fluid 3 in the fluid-tight housing 2. The coolant fluid 3 is electrically insulating, such that electrical interconnection cannot result in any short-circuit. The coolant fluid 3 may be an insulating oil (e.g., a silicone oil).

In order to permit the more effective transfer of a temperature increase of the coolant fluid 3 to the housing 2, one or more cooling elements 5 (e.g., a first cooling element) are configured in an interior of the housing 2. The one or more cooling elements 5 improve heat transfer from the coolant fluid 3 to the housing 2. In one embodiment, the first cooling element 5 and the housing 2 are at least partially comprised of metal. The first cooling element 5 may incorporate first cooling ribs 7, by which a surface area of the first cooling element is enlarged.

The housing 2 is surrounded by a coolant 10 (e.g., by air or a fluid). One or more second cooling elements 6 (e.g., a second cooling element) having second cooling ribs 8 are arranged on the exterior of the housing 2, such that evacuation of heat from the housing 2 or the first cooling element 5 to the coolant 10 may be further reinforced.

At least one valve 9 is also provided (e.g., situated) on the housing 2. Through the at least one valve 9, in the event of a phase transition of the coolant fluid 3 from a liquid form to a gaseous form, the now gaseous coolant fluid 3 may be evacuated from the housing 2. Heat may also be removed from the battery cells 1 as a result of the phase transition (i.e., "evaporative cooling").

Figure 2:
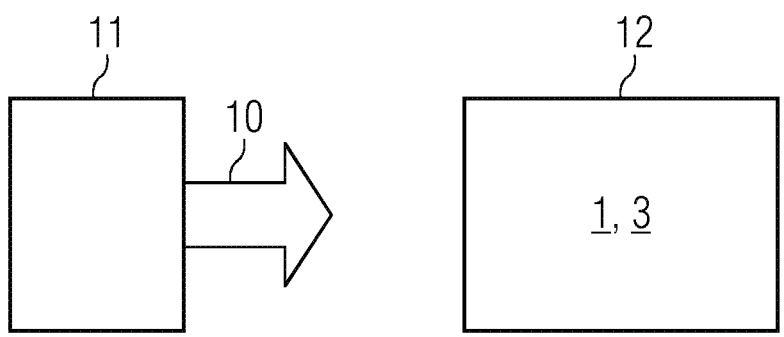
FIG. 2 shows one embodiment of an assembly for cooling battery cells with a cooling unit.

FIG. 2 shows an arrangement having an assembly according to FIG. 1, where only the housing 2, with the battery cells 1 and the coolant fluid 3, are schematically represented. A gaseous coolant 10 is actively cooled by a cooling unit 12 (e.g., by a heat-exchanger) and is routed to the housing 2. As a result of this, a reinforced evacuation of heat may be executed.

Figure 3:
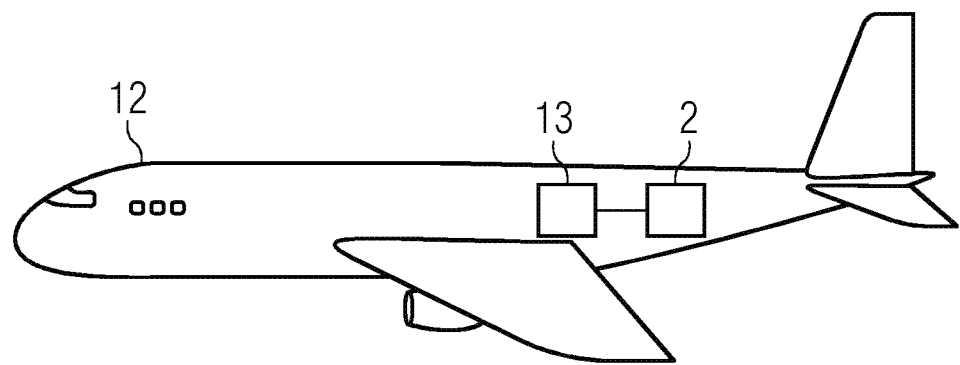
FIG. 3 shows one embodiment of an aircraft having an electrical drive and an assembly for the cooling of battery cells.

FIG. 3 shows an assembly according to FIG. 1 or FIG. 2, represented by the housing 2 in a stylized manner. The assembly is located in an aircraft 12. The assembly supplies an electrical drive 13 with electrical energy.

Although the invention has been illustrated and described in greater detail via the exemplary embodiments, the invention is not limited by the examples disclosed. Further variations may be inferred herefrom by a person skilled in the art without departing from the protective scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An assembly comprising:
   a housing;
   a plurality of battery cells that are electrically interconnected, the plurality of battery cells being disposed in the housing;
   a coolant fluid that directly surrounds the plurality of battery cells, the coolant fluid being electrically insulating;
   a valve configured on the housing; and
   a coolant disposed outside of the housing, wherein the coolant surrounds the housing and is in contact with an outer surface of the housing,
   wherein the valve is configured, upon transition of the coolant fluid to a gaseous state, to evacuate the coolant fluid in the gaseous state out of the housing and into the coolant surrounding the housing and in contact with the outer surface of the housing.

2. The assembly of claim 1, wherein the coolant fluid is an insulating oil.

3. The assembly of claim 2, wherein the insulating oil is a silicone oil.

4. The assembly of claim 1, further comprising:
   at least one first cooling element that is arranged on the housing in an interior of the housing, the at least one first cooling element being operable as a heat-sink configured for a take-up of heat from the coolant fluid and an evacuation thereof to the housing, to an environment, or to the housing and to the environment.

5. The assembly of claim 4, wherein a first cooling element of the at least one first cooling element comprises first cooling ribs.

6. The assembly of claim 4, wherein a first cooling element of the at least one first cooling element is at least partially made of metal.

7. The assembly of claim 4, further comprising:
at least one second cooling element arranged on the exterior of the housing, the at least one second cooling element being operable as a heat sink configured for a take-up of heat from the at least one first cooling element, from the housing, or from the at least one first cooling element and from the housing, and for evacuation thereof to the environment.

8. The assembly of claim 7, wherein a second cooling element of the at least one second cooling element comprises second cooling ribs.

9. The assembly of claim 7, wherein a second cooling element of the at least one second cooling element is at least partially made of metal.

10. The assembly of claim 1, further comprising:
a cooling unit configured for cooling of the coolant.

11. The assembly of claim 1, wherein a battery cell of the plurality of battery cells is a lithium-ion battery cell, a lithium-polymer battery cell, or a solid electrolyte battery.

12. An aircraft comprising:
an electrical drive; and
an assembly comprising:
a housing;
a plurality of battery cells that are electrically interconnected, the plurality of battery cells being disposed in the housing;
a coolant fluid that directly surrounds the plurality of battery cells, the coolant fluid being electrically insulating;
a valve configured on the housing; and
a coolant disposed outside of the housing, wherein the coolant surrounds the housing and is in contact with an outer surface of the housing,
wherein the valve is configured, upon transition of the coolant fluid to a gaseous state, to evacuate the coolant fluid in the gaseous state out of the housing and into the coolant surrounding the housing and in contact with the outer surface of the housing.

13. The aircraft of claim 12, wherein the assembly further comprises:
at least one first cooling element that is arranged on the housing in an interior of the housing, the at least one first cooling element being operable as a heat-sink configured for a take-up of heat from the coolant fluid and an evacuation thereof to the housing, to an environment, or to the housing and to the environment.

14. The aircraft of claim 13, wherein a first cooling element of the at least one first cooling element comprises first cooling ribs.

15. The aircraft of claim 13, wherein a first cooling element of the at least one first cooling element is at least partially made of metal.

16. The aircraft of claim 13, wherein the assembly further comprises:
at least one second cooling element arranged on the exterior of the housing, the at least one second cooling element being operable as a heat sink configured for a take-up of heat from the at least one first cooling element, from the housing, or from the at least one first cooling element and from the housing, and for evacuation thereof to the environment.

17. The aircraft of claim 16, wherein a second cooling element of the at least one second cooling element comprises second cooling ribs.

\* \* \* \* \*